United States Patent [19]

Doerr et al.

[11] Patent Number: 4,798,279

[45] Date of Patent: Jan. 17, 1989

[54] MINE HAULAGE METHOD AND APPARATUS

[75] Inventors: Richard E. Doerr; Margaret A. Roberts, both of Morgantown; Harry J. Brown, Barrackville, all of W. Va.

[73] Assignee: Consolication Coal Company, Pittsburgh, Pa.

[21] Appl. No.: 935,290

[22] Filed: Dec. 5, 1986

Related U.S. Application Data

[63] Continuation-in-part of Ser. No. 822,100, Jan. 24, 1986, abandoned.

[51] Int. Cl.$^4$ .............................................. B65G 15/26
[52] U.S. Cl. ................................. 198/594; 198/861.1
[58] Field of Search ................... 198/861.1, 584, 861.2, 198/594

[56] References Cited

U.S. PATENT DOCUMENTS

| | | | |
|---|---|---|---|
| 1,278,055 | 9/1918 | Stuart | 198/861.2 X |
| 1,932,897 | 9/1932 | Jaggard | 198/588 X |
| 1,999,932 | 4/1934 | Hughes | 198/588 X |
| 4,339,031 | 7/1982 | Densmore | 198/861.2 X |
| 4,476,975 | 10/1984 | Densmore | 198/861.1 X |

*Primary Examiner*—Frank E. Werner
*Assistant Examiner*—James R. Bidwell
*Attorney, Agent, or Firm*—Alan N. McCartney

[57] ABSTRACT

A method and apparatus for continuously transporting mined material for a determined distance from a continuous mining machine in a mine having a roof and a floor to a permanently installed extendable length conveyor in a mine. The method is accomplished by installing an overhead rail supported conveyor along and above the fixed and extendable length conveyor. The overhead rail supported conveyor has at least a length equal to the determined distance and in addition the overhead rail supported conveyor includes a pivoted feed. A self-propelled tramming conveyor is installed having a length at least equal to the determined distance with its discharge cooperating with the pivoted feed of the overhead rail supported conveyor and its feed adapted to receive the material mined by a continuous mining machine. When the conveyors have travelled the determined distance, the overhead rail supported conveyor has its feed pivoted upwards flush with the remaining portion of the conveyor and rolled back over the fixed conveyor. The fixed conveyor is extended the length of a new determined distance. The overhead rail supported conveyor is then moved again over the fixed conveyor with its feed repivoted downwards in position to receive material from the tramming conveyor. The tramming conveyor is then moved back into position for a new mining sequence.

2 Claims, 2 Drawing Sheets

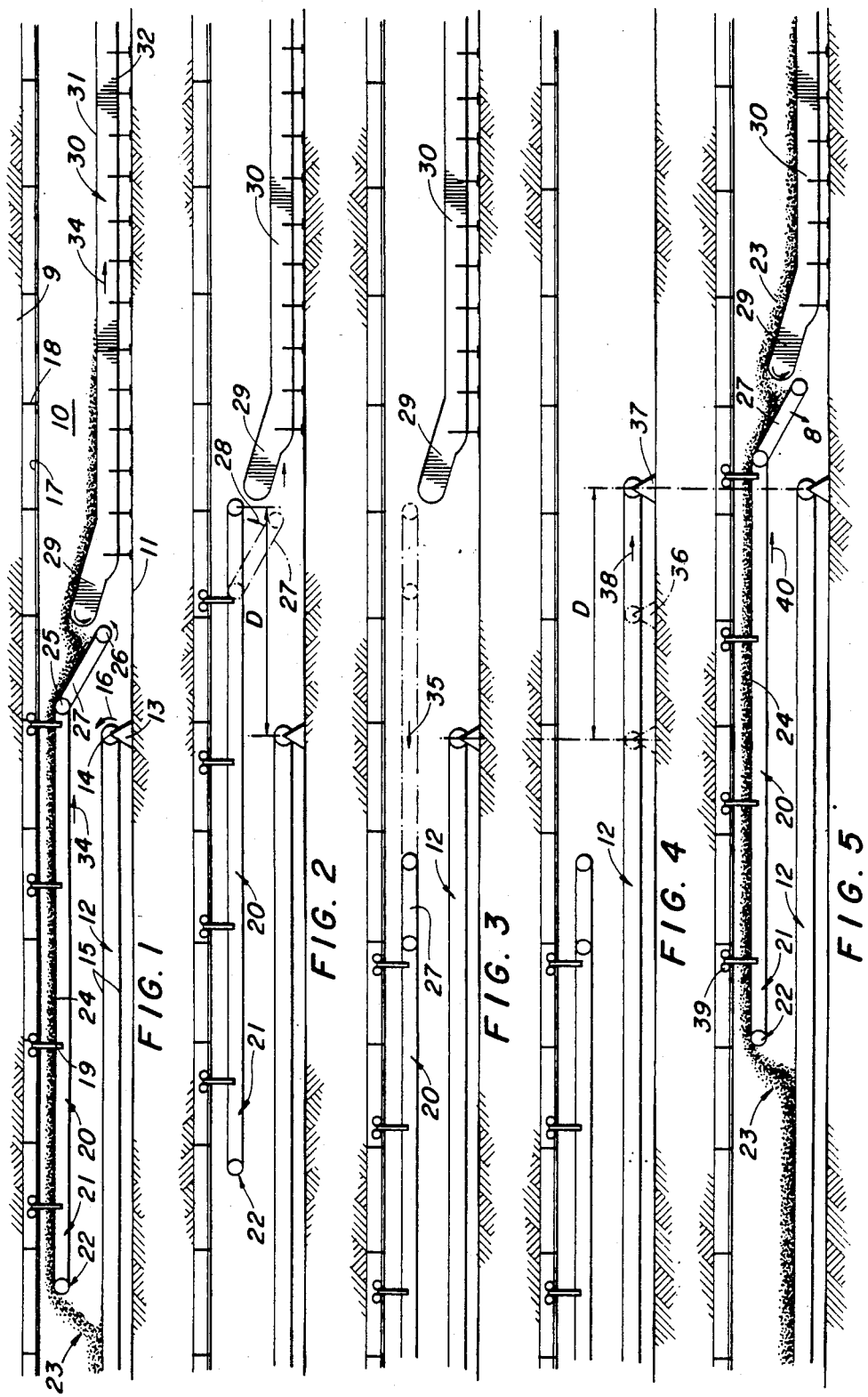

MINE HAULAGE METHOD AND APPARATUS

This application is a continuation-in-part of U S. application Ser. No. 822,100 filed Jan. 24, 1986 abandoned.

BRIEF DESCRIPTION OF THE PRIOR ART

The best prior art known to Applicant is the patent issued to Nole W. Densmore, U.S. Pat. No. 4,476,975. That patent discloses a conveyor system which is adapted to be suspended from an overhead monorail and has a feed for receiving material from a conventional means and a discharge suspended over a fixed conveyor system. The feed to the monorail system is a conventional wheel supported conveyor which can be pivoted horizontally over the floor in order to receive material or to steer the conveyor. The pivoted feed is separately powered and is steered by an operator to follow the mining machine. The purpose of the pivoted feed is to follow variations in the mine floor.

The patent to K. W. Stocker, U.S. Pat. No. 3,190,696 illustrates a fixed conveyor in combination with a tramming conveyor which is coupled to a mining machine. The patent is basically adapted for long wall mining, rather than room and pillar mining.

The patent to C. E. McWhorter, U.S. Pat. No. 2,874,945 illustrates a patent relating to a mining method, such patent including a pair of fixed conveyors and a means for providing access to the fixed conveyors during the mining procedure. McWhorter, like the above referenced patent to Stocker, uses a combination of tramming conveyors and fixed conveyors to provide a form of continuous transportation from the continuous mining machine to the fixed belt conveyor system in the mine. The McWhorter patent uses a combination of fixed belts, rather than the system disclosed in this invention.

BRIEF DESCRIPTION OF THE INVENTION

This invention provides continuous transportation from the mining machine to the fixed belt transportation conveyor system in the mine. The invention basically provides a method and apparatus for continuously transporting mined material for a determined distance from a continuous mining machine in a mine having a roof and a floor by installing a fixed, extendable length conveyor along a haulageway in the mine, and then installing an overhead rail supported conveyor along and above said fixed and extendable conveyor, such that the overhead rail supported conveyor has a length at least equal to the determined distance to be mined. The overhead rail supported conveyor in addition has a vertically pivotal feed to allow the fixed, extendable conveyor to be extended more easily. A tramming conveyor is installed in the mine between the feed end of the overhead rail supported conveyor and the mining machine location. The tramming conveyor has a length at least as long as the determined distance.

The method for mining provides pivoting downwardly and coupling the feed of the overhead rail supported conveyor to the discharge of the tramming conveyor, then moving the tramming conveyor along with said coupled overhead rail conveyor with the mining machine, until the mining machine has extended at least the determined distance. Upon completion of mining the determined distance the feed of the overhead rail suspended conveyor system is pivoted vertically in line with the overhead rail suspended conveyor system and the entire overhead rail suspended conveyor system is pulled back until it is over the fixed extendable conveyor. The extendable length conveyor is then extended a new determined distance and the overhead rail supported conveyor is moved forward and recoupled to the tramming conveyor and the process continued. With proper selection of the determined distance for mining, the continuous operation need only be terminated at a convenient period for extending the fixed conveyor length.

BRIEF DESCRIPTION OF THE FIGURES

FIG. 1 illustrates the conveyor system at the start up of a mining operation;

FIG. 2 illustrates vertically pivoting the feed end of the overhead rail supported conveyor prior to retracting the overhead rail supported conveyor;

FIG. 3 illustrates the retraction of the overhead rail supported conveyor;

FIG. 4 illustrates the extension of the fixed conveyor a new determined distance; "D".

FIG. 5 illustrates the operation of the conveyor system at the start up of the new determined distance;

DETAILED DESCRIPTION OF THE INVENTION

Figure 6:
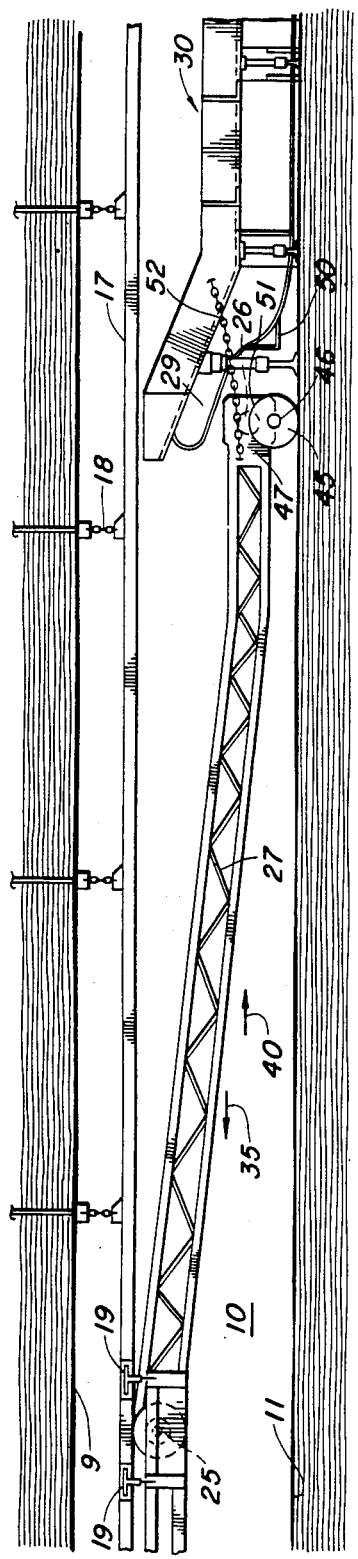
FIG. 6 is a detailed view of the pivotal end of the overhead rail supported conveyor illustrated coupled to the tramming conveyor for movement during the mining process.

Referring to all of the FIGURES but in particular to FIGS. 1 through 5, the method of mining using the combination of a fixed conveyor, an overhead rail supported conveyor and a tramming conveyor will be described.

Referring in particular to FIG. 1 a mine haulageway, generally referred to by the number 10, has a floor 11 and a roof 9. Fixed and extendable length conveyor 12 comprises a mount 13 of which there may be any number along the length of the conveyor. Only one is illustrated here for simplicity of description. Attached to mount 13 is a conveyor support roller 14. Attached to support roller 14 is a belt 15 moving in the direction of arrow 16 for transporting material out of the mine. Attached to roof 9 is an overhead rail or rails 17. One or a plurality of rail 17 may be attached through the use of hangers 18 to roof bolts or any other usual means well known in the art. A plurality of roller mounted supports 19 suspend an overhead rail supported conveyor, generally referred to by arrow 20, in a manner to provide movement of conveyor 20 along overhead rail or rails 17. Overhead rail supported conveyor 20 has a discharge end 21 and discharges at location 22 for depositing material 23 onto belt 15 from overhead rail supported conveyor 20. The feed 27 to overhead rail supported conveyor 20 is provided with a pivotal location 25 and a support roller 26 for belt 24. It is obvious that any of the rollers can be drive rollers and there will be, under normal conditions, several support rollers along the overhead rail supported conveyor. The conveyor may also contain braking systems not illustrated. Such braking systems are well known in the art. The braking systems will generally prevent the overhead rail supported conveyor from moving along the rail in the case where the rail is sloping down or up, rather than being level.

A tramming conveyor, generally referred to by the number 30, has an upper conveyor surface 31 and a return surface 32 and is moved by conventional means which are not part of this invention. The feed end of tramming conveyor 30 is not illustrated, such feed is well known and not part of this invention.

The location of fixed conveyor 12, overhead rail supported conveyor 20 and tramming conveyor 30 are all illustrated at the beginning of the mining process. Once tramming conveyor 30 begins to move in the direction of arrow 34, overhead rail supported conveyor 20 must likewise move in the direction of arrow 34. Both the overhead rail supported conveyor 20 and tramming conveyor 30 will continue to move until they have moved a determined distance down main haulageway 10. It is obvious that the tramming conveyor is not limited to remaining in haulageway 10, but may move in any direction in response to the desired mining plan, such plan will be discussed with reference to FIG. 7.

Referring to FIG. 2, once tramming conveyor 30 has moved a determined distance D, it should be understood that the determined distance D is here illustrated as a fairly short distance; however, the determined distance may be anywhere from 100 to 1,000 feet, or more but for illustrative purposes only, the distance D is selected in order to illustrate the movement of the conveyors in response to the mining plan.

Once the determined distance has been reached, the feed end 27 is pivoted in the direction of arrow 28 until the axis of feed 27 is substantially aligned with the axis of the remainder of the overhead rail supported conveyor 20. Once feed portion 27 has been pivoted to the location shown in FIG. 2, then referring to FIG. 3, the overhead rail supported conveyor is retracted in direction of arrow 35 until the overhead supported conveyor pivotal feed end 27 is at least over fixed conveyor 12.

Once overhead rail supported conveyor 20 has reached the position shown in FIG. 3, then fixed conveyor 12 is extended the distance D illustrated in FIG. 4. It is understood, of course, that the distance D may be a single block of mining, as will be discussed in FIG. 7, such single block will be a distance illustrated by location 6, or a double block as illustrated by location 37. While single and double block movements are illustrated in FIG. 4, it is obvious that any multiple of blocks can be used determined by the mining plan and by the length of overhead rail supported conveyor 20 and tramming conveyor 30.

If the fixed conveyor is moved to location 37, as illustrated in FIG. 4, by extending the conveyor, as illustrated by arrow 38, the FIG. 5 will illustrate the new beginning mining location for the various conveyors. Overhead rail supported conveyor 20 will be moved back to the location illustrated in FIG. 5. Tramming conveyor 30 will be moved to a location where it can dump its material 23 onto the feed end 27 which has been repivoted in the direction of arrow 8 for receiving such material. The material will then be conveyed along the overhead rail supported conveyor on belt 24 and deposited on fixed conveyor 12, as previously discussed.

Overhead rail supported conveyor 20 can be moved in any of a number of ways. First, it can contain its own power, that is, a motorized set of pulleys 39, for example, can move the conveyor in either the direction of arrow 35, as illustrated in FIG. 3, or the direction of arrow 40, as illustrated in FIG. 5. Likewise, a winch can be used to move conveyor 20 in either direction. Furthermore, conveyor 20 can be moved by the movement of tramming conveyor 30 with tramming conveyor 30 pushing against the end of the feed end 27 of overhead rail supported conveyor 20 until the conveyor has reached the desired location, as shown, for example, in FIG. 2. When the conveyor needs to be returned to the position shown in FIG. 5 along the direction of arrow 40, a winch can be attached between the overhead rail supported conveyor 20 and any fixed anchor and conveyor 20 can be pulled into position. The winch can likewise be attached at any suitable location, such as on tramming conveyor 30. Once conveyor feed 27 is in the position, as shown in FIG. 5, for receiving material from tramming conveyor 30, it is normally preferable to attach feed end 27 to tramming conveyor discharge end 29. This attachment is illustrated in FIG. 6.

Referring to FIG. 6, the pivotal portion 27 of overhead rail supported conveyor 20 along with the tramming conveyer 30 is illustrated. In the preferred embodiment, pivotal portion 27 is supported on floor 11 of haulageway 10 by means of a pair of skids or of wheels 45 pivotally mounted through an axle 46 to an end frame 47 of pivotal portion 27. In order to raise and lower the pivotal portion 27, any means can be provided.

Tramming conveyor 30 is coupled to overhead rail supported conveyor 20 through a bumper 50 which strikes a plate 51 at the end of overhead rail supported conveyor 20. The two may be flexibly coupled together using a chain 52. Thus, when overhead rail supported conveyor 20 is to be moved in the direction of arrow 35, tramming conveyor 30 can move in the direction of arrow 35 with bumper 50 striking 51 urging the rail supported conveyor in the proper direction. When conveyor 20 is desired to be pulled in the direction of arrow 40, then chain 52 can be utilized as illustrated between the feed end of conveyor 20 and the discharge end of conveyor 30 and conveyor 20 can then be pulled as tramming conveyor 30 moves in the direction of arrow 40. As previously discussed, the invention is not so limited as to provide movement only using the tramming conveyor 30. It is obvious that any means can be used to move overhead supported conveyor 20, such as a cable and winch or motorized pulleys on the rail supported conveyor. It is also obvious that wheel 45 can be powered providing movement for conveyor 20 if the resistance of movement of conveyor 20 is not too high. The coupling can be chain, wire rope, or any other mechanical linkage or joint.

Figure 7:
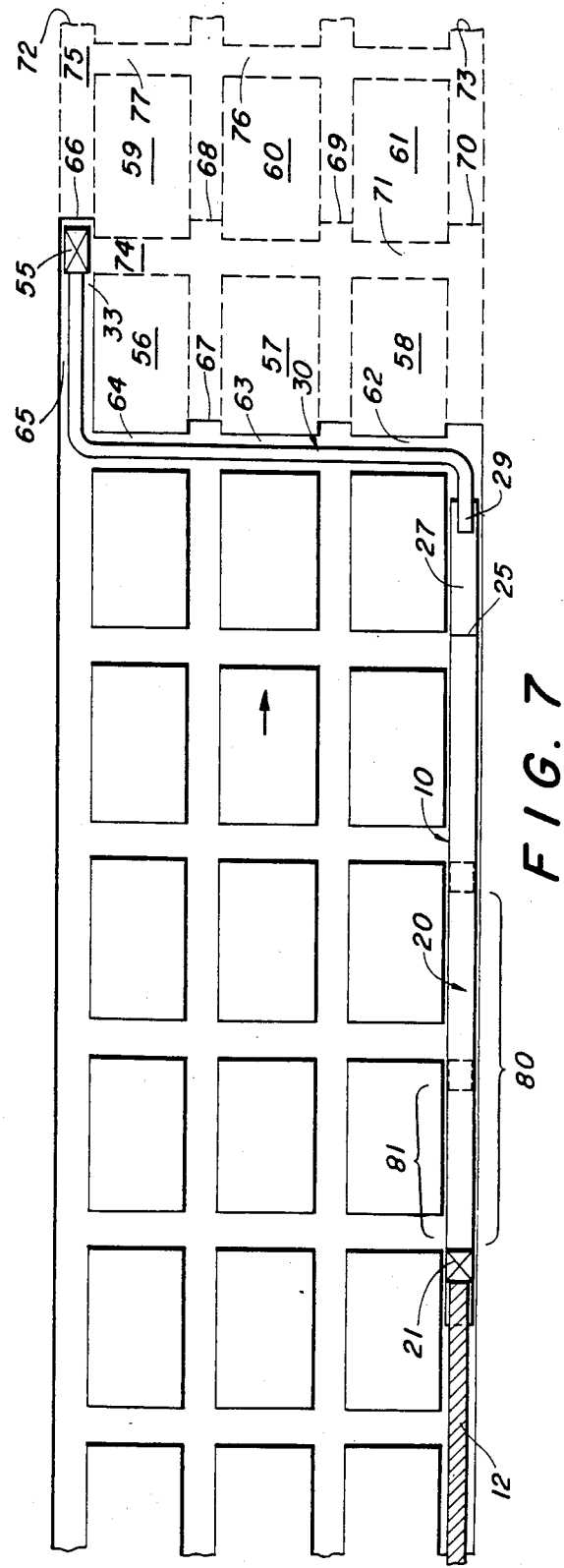
FIG. 7 is a plan view of the mine illustrating the fixed conveyor, the overhead rail supported conveyor and the tramming conveyor under normal use.

Referring to FIG. 7, a mine plan is illustrated utilizing the methods and equipment illustrated in FIGS. 1 through 6. In the mining plan illustrated in FIG. 7, fixed conveyor 12 is mounted under overhead rail supported conveyor 20 as previously illustrated with discharge end 21 over fixed conveyor 12. Discharge end 29 of tramming conveyor 30 is likewise positioned over feed end 27 of overhead rail supported conveyor 20. The feed end 33 of tramming conveyor 30 is positioned to receive material directly from a continuous miner 55. The mine plan illustrated is a room and pillar mining method, the plan having several proposed pillars 56, 57 and 58, as a first sequence for mining and pillars 59, 60 and 61, as a second sequence for mining. The extension of fixed conveyor 12 has already been performed as illustrated in FIGS. 4 and 5. The mining machine will then proceed down rooms 62, 63, 64, and 65 to location 66 as illustrated in FIG. 7. Once the mining machine reaches location 66, the entire conveyor system comprising tramming conveyor 30 and conveyor 20 will be retreated until the mining machine reaches location 67, where the mining machine will proceed down to location 68. The procedure will then be repeated with the mining machine proceeding down to location 69 and subsequently to location 70. The mining machine now turns and proceeds to location 74 by mining room 71. The maximum extension of the overhead rail supported conveyor 20 at this time has been half of the predetermined distance if two blocks are to be mined. If only one block is the predetermined distance, then the procedure set out in FIGS. 1 through 5 must be followed in order to re-extend the fixed conveyor so that the mining may proceed. It should be noted that at no time has the overhead rail supported conveyor 20 needed to be extended around and into mining portions 62, 63, 64 and 65 in order to provide mining capability. This region is all covered by tramming conveyor 30.

Once the mining machine along with the respective conveyors has reached point 74, then the same procedure as that illustrated for blocks 56, 57 and 58 will be repeated. That is, the mining machine will then turn and start down section 75, eventually reaching location 72 proceeding identically with the remaining blocks 59, 60 and 61 until it will eventually reach location 73. Again, the mining machine and tramming conveyor 30 will turn and mine room 76 until it reaches location 77. Once the mining machine has reached location 77 fixed conveyor 12 will be extended for the first time in the case of a two-block move 80 or for the second time in the case of a one-block move 81. It should be pointed out at this time that the maximum extension of overhead rail supported conveyor 20 will provide transportation of material from tramming conveyor 30 with the mining machine at location 77.

While use of an overhead rail supported conveyor has been disclosed, it is obvious that a floor-mounted rail system of any overhead travelling suspension system or any other form of travelling conveyor mounted above the fixed conveyor 12 can be utilized and is within the spirit and scope of this invention.

For the purpose of description, the present invention has been described in terms of a continuous mining machine passing mined material directly to the tramming conveyor. Those skilled in this art will realize that intermediate vehicles or conveyors may be used between the mining machine and the tramming conveyor and still be within the spirit and scope of this invention.

It is obvious, of course, that other mining configurations can be used and still be well within the spirit and scope of this invention as described in the specification and appended claims.

What we claim is:

1. A method for conveying material along a curvilinear path for continuously transporting mined material for a determined distance from a continuous mining machine in a mine having a roof and a floor, comprising:
   (a) installing a fixed, extendable length conveyor in said mine along a floor, said fixed conveyor extending to said continuous mining machine less said determined distance;
   (b) installing an overhead rail supported conveyor along and above said fixed and extendable length conveyor having at least a length equal to said determined distance, said overhead rail supported conveyor likewise including a pivotal feed;
   (c) installing a tramming conveyor having a length at least equal to said determined distance, between the said pivotal feed of said overhead rail supported conveyor and said mining machine;
   (d) pivoting said feed end of said overhead rail supported conveyor downward to couple to said tramming conveyor and receive discharges from said tramming conveyor;
   (e) progressively moving said tramming conveyor along with said coupled overhead rail supported conveyor said determined distance to a first position;
   (f) pivoting said feed end of said overhead rail supported conveyor to a height where said overhead rail supported conveyor will clear said fixed conveyor;
   (g) moving said overhead rail supported conveyor to a second position where it is suspended entirely over said fixed conveyor;
   (h) extending said fixed conveyor an additional determined distance; and,
   (i) moving said overhead rail supported conveyor back to said first position; and
   (j) repeating steps (d), (e) and (f) until a desired amount of mining is completed.

2. A method as described in claim 1 wherein said pivotal feed end of said overhead rail supported conveyor is moved along with said tramming conveyor by securing said feed end of said overhead rail supported conveyor to the discharge end of said tramming conveyor.

* * * * *